United States Patent [19]

Armstrong et al.

[11] 4,356,514
[45] Oct. 26, 1982

[54] APPARATUS FOR USE IN SCANNING A CINEMATOGRAPH FILM

[75] Inventors: Andrew S. Armstrong, Ilford; Martin R. Sach, Tewin Wood, both of England

[73] Assignee: Transcan Video Limited, London, England

[21] Appl. No.: 194,318

[22] Filed: Oct. 6, 1980

[30] Foreign Application Priority Data

Oct. 8, 1979 [GB] United Kingdom ................ 7934819

[51] Int. Cl.³ .............................................. H04N 3/36
[52] U.S. Cl. .................................... 358/214; 358/54
[58] Field of Search ........................... 358/214–216, 358/54

[56] References Cited

U.S. PATENT DOCUMENTS

| 3,604,850 | 9/1971 | Eckenbrecht | 358/214 |
| 4,054,918 | 10/1977 | Kamogawa | 358/214 |
| 4,205,337 | 5/1980 | Millward | 358/214 |
| 4,268,865 | 5/1981 | Millward | 358/216 |

FOREIGN PATENT DOCUMENTS 1361457 7/1974 United Kingdom ................ 358/214

Primary Examiner—Michael A. Masinick
Attorney, Agent, or Firm—Robert F. O'Connell

[57] ABSTRACT

In a flying spot film scanner for scanning a cinematograph film frame by frame during continuous movement of the film and producing a television video signal, apparatus is provided which processes signals representative of the direction of film movement, rate of film movement, position of each film frame in a film gate, times for television fields to begin, and rate of vertical deflection in a raster suitable for scanning a stationary film frame, to produce a composite output signal suitable for effecting the vertical deflection and positioning of a raster intended to scan a frame of a film moving so as to give rise to such signals. The required processing is effected by using an up/down position counter in which the number represents the current position of a reference point in whichever film frame is entering a scanning region defined by the film gate, and a composite signal counter in which the counting is started at the beginning of each television field from the loading in of the current number in the position counter and is effected from this number by clock pulses, some of which are representative of the rate of vertical deflection in a raster suitable for scanning a stationary film frame, and others representative of the rate of movement of the film. The direction of counting of the pulses representing the stationary frame raster rate is predetermined in accordance with the orientation of the film frame pictures relative to the apparatus. The direction of counting of the pulses representing the film rate is determined in dependence upon the direction of movement of the film. The number in the composite counter is converted into an analog signal which is supplied to vertical deflection circuitry determining the vertical deflection of the beam of the cathode ray tube producing the scanning raster.

9 Claims, 10 Drawing Figures (a)

(b)

APPARATUS FOR USE IN SCANNING A CINEMATOGRAPH FILM

BACKGROUND OF THE INVENTION

This invention relates to apparatus for use in scanning a cinematograph film from which a television video signal is to be produced while the film is being moved in a continuous manner.

The principal problem which such apparatus must cope with is the difference between the rate at which conventional cinematograph film must be viewed in order to give a reproduction of the appearance of the recorded scene which is true with regard to movement in the original scene, and the conventional rate of formation of television pictures. For example, many cinematograph films are intended to be projected at 24 frames per second, and in the European PAL system of colour television, 50 television fields consisting of 25 pairs of interlaced rasters are formed each second. It is well known to run such a film at 25 frames per second, since at this rate there is substantially no noticeable unnaturalness about movement in a reproduced scene, and to scan each film frame picture twice. The pair of rasters which scan each frame picture in this method are displaced from one another, the second of the pair being displaced from the first in the direction of movement of the film. Furthermore, for a conventional cinematograph film in which the intended horizontal dimension of each film frame picture is transverse to the length of the film, the vertical dimension of each raster is compressed in proportion to foward film speed and expanded in proportion to reverse film speed.

The conventional measures adopted to allow for these effects of the film movement on the vertical extent needed for each raster and the vertical positioning of the raster are to generate a basic vertical deflection signal in the form of a regular sawtooth with a repetition rate equal to the field frequency of the television system, e.g. 50 hertz for PAL, and a slope which would give the required vertical deflection of a cathode ray tube generated raster pattern for projection onto a stationary frame picture of the film, and to superimpose this basic signal on a compensating signal which is derived by sensing the film speed and direction and the position of film frames as they enter a scanning region. However, this approach introduce unnecessary constraints.

SUMMARY OF THE INVENTION

The invention is based on the fact that it is not necessary to generate the basic vertical deflection signal when the film is moving. According to the present invention, therefore, there is provided apparatus for use in scanning a cinematograph film from which a television video signal is to be produced while the film is being moved in a continuous manner in a film transport, the apparatus including means for generating signals representative of the rate of movement of a cinematograph film in the transport, direction of movement of the film and the position of a predetermined point along the length of each film frame during the time in which the said point moves from a reference position in a film scanning region to a position reached when the predetermined point of the next film frame entering the scanning region arrives at the reference point. Raster reference means are provided for producing a raster reference signal having a value representative of the rate of increase of the vertical coordinate of a scanning raster having the dimensions required for scanning a frame of the film in the absence of movement of the film. Signal combining means are coupled to the signal generating means and to the raster reference means and adapted to sample the value of a position signal substantially at each time at which a scanning raster is to be initiated by an electro-optical raster source when coupled to a raster output of the combining means. The signal combining means are supplied by the signal generating means with a signal indicative of direction of movement and with a signal representative of rate of movement of the film and are such as to produce at the raster output in each interval beginning substantially at the time of a respective sampled value of the position signal and ending substantially at the time of the next sampled value thereof an output signal having a value substantially representing the said vertical coordinate of the scanning raster required for scanning a frame of the film during the said interval, the said vertical coordinate being parallel to the length of the film at least at the scanning region.

Preferably the signal generating means is such that the said signal representative of rate of movement of the film varies with the length of film passing through the scanning region in a unit of time.

The signal generating means may include means for generating a reference train of pulses having a repetition rate which varies with but is not greater than the frame rate of the film.

For example, in a preferred embodiment a reference train of pulses is generated having a repetition rate which is an integral submultiple of the frame rate of the film and is utilized in the production of a further reference train of pulses with a repetition rate equal to the frame rate. In this embodiment, the signal generating means includes an up/down counter arranged to be so reset by each pulse of the further reference train that the count in this counter at the start of each counting cycle is representative of the said reference position, the said signal representative of rate of movement of the film being supplied as clock signal to the said up/down counter, and the signal indicative of direction of movement being so supplied to the said up/down counter as to determine the direction of counting thereof in dependence upon the direction of movement of the film, whereby the count in the said up/down counter is representative of the position of the predetermined point of each film frame during the said time in which the said point moves from the reference position to the other said position.

For producing the said signal indicative of direction of movement of the film, the signal means may include means for generating two trains of pulses having equal repetition rates and a phase displacement relative to one another which changes only with change in the direction of movement of the film. Preferably the equal repetition rates of the said two trains are equal to an integral multiple of the frame rate of the film, and the signal generating means includes a pulse rate dividing counter adapted to divide the rate of one of the said two trains of pulses and to thereby produce the said further reference train of pulses, the dividing counter being arranged to be reset by each pulse of the first said reference train of pulses. The two trains of pulses having equal repetition rates may be applied to a bistable circuit such that the state of the bistable circuit changes in response to a change in the relative phase displacement of the said two trains.

For use in so producing the said signal representative of rate of movement of the film that the said signal varies with the length of film passing through the scanning region in a unit of time, the signal generating means may include a pulse generator arranged to generate pulses at a rate dependent upon the rate of rotation of a capstan drawing film through the said scanning region.

In a preferred embodiment, the signal combining means includes an up/down counter adapted to load in the count in the up/down counter of the signal generating means substantially at each time at which a scanning raster is to be initiated and to count from the count thus loaded therein a plurality of clock pulses produced in the signal combining means in response to the said signal representative of rate of movement, and a plurality of clock pulses produced in the signal combining means in response to the said raster reference signal, the direction of counting of the clock pulses produced in response to the said signal representations of rate of movement being carried out in a direction determined by the signal indicative of direction of movement of the film and the direction of counting of the clock pulses produced in response to the said raster reference signal being arranged to correspond to the direction required for producing output signal values representative of the increasing vertical coordinate of a scanning raster for scanning a frame of the film in the absence of movement of the film.

The invention will now be described in more detail, solely by way of example, with reference to the accompanying drawings.

DETAILED DESCRIPTION OF THE PREFERRED EMBODIMENT

Figure 1:
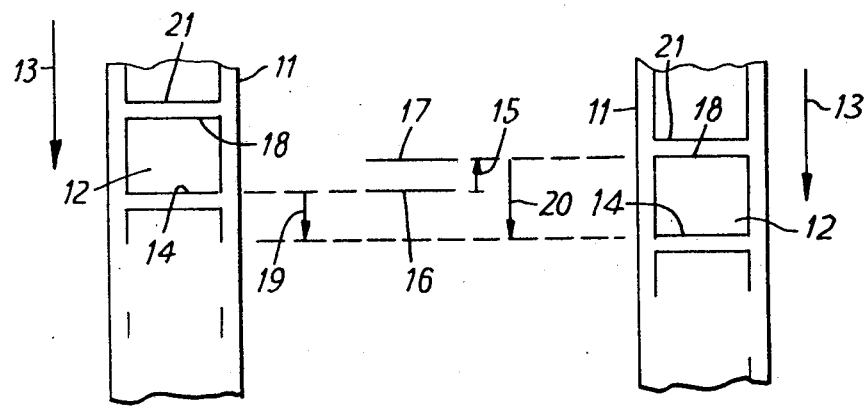
FIG. 1 is a schematic representation of forward movement of a film frame in a scanning region.

FIG. 1 shows a piece of a film 11 being scanned, the left hand side of FIG. 1 showing the position of the film at the beginning of a scanning raster on a film frame 12, and the right hand side showing the position of the film at the end of the same raster. The film 11 in FIG. 1 is moving in its foward direction which is downwards in FIG. 1 as indicated by arrows 13, and the top line of each picture constituting a frame of the film 11 is lowermost in FIG. 1 and serves as the leading edge of the respective frame. In FIG. 1, the rate of movement of the film 11 is twenty-five frames per second and the rate of raster generation is fifty fields per second, so that the picture of each film frame can be scanned twice, the two rasters being interlaced as is conventional in PAL and NTSC television scanning.

Since each raster starts at the top line of a film picture and ends at the bottom of that picture, the distance, measured parallel to the movement of the corresponding film frame, between the first and last lines of each raster is, in the example of FIG. 1, slightly less than half the length of a film frame, ie half the distance separating two successive leading edges of film frames. This short distance is illustrated in FIG. 1 by an arrow 15 whose direction indicates the direction of vertical progression in the raster and whose length is the distance between a broken, horizontal line 16 aligned with the initial position of the top line 14 of the picture of the frame 12 and a broken horizontal line 17 aligned with the final position of the bottom line 18 of the picture of the frame 12. The distance moved forward by the leading edge of the frame 12 is indicated by an arrow 19 and the distance which the scanning spot must leap in order to be in the correct position to begin the next raster, ie at the leading edge of the frame 12 after the first raster, is indicated by an arrow 20. During the subsequent fiftieth of a second the scanning spot carried out a second raster which ends at a level slightly below that of the line 16 and then jumps back to the level of the line 16 at which the top line 21 of the picture of the next frame after the frame 12 is now present.

Figure 2:
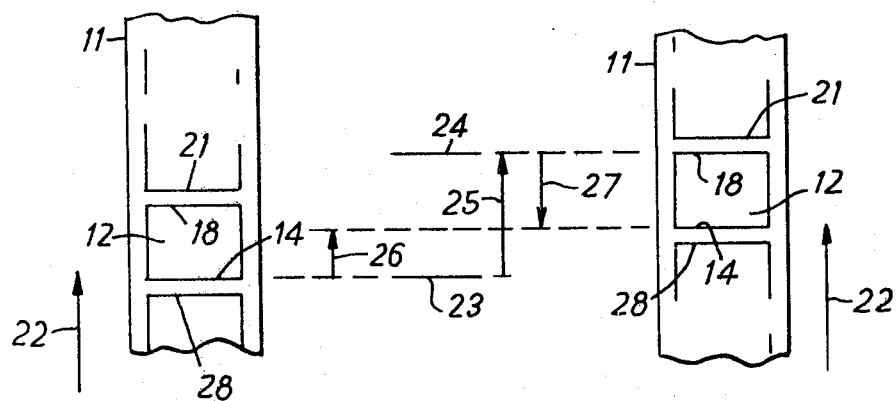
FIG. 2 is a schematic representation of reverse movement of a film frame in a scanning region.

FIG. 2 illustrates the same piece of the film 11 running in reverse at twenty-five frames per second, the direction of the movement of the film 11 being indicated by arrows 22. In this example the bottom line 18 of the picture of the frame 12 is the leading edge of the frame. Each raster must still start at the top line of a film picture and therefore the first raster scanning the frame 12 starts at the level, indicated by broken line 23 in FIG. 3, of the top line 14 of the picture of the frame 12. During the time occupied by the first raster, the film 11 moves nearly half a frame in reverse, so that the position of the bottom line 18 of the frame 12 is as shown at the right hand side of FIG. 2 and the first raster ends at the level of a broken horizontal line 24 aligned with the bottom line 18. Consequently the vertical extent of the first raster is represented by an arrow 25 reaching from the line 23 to the line 24. The top line 14 of the picture of the frame 12 is then almost half a frame beyond its starting position, in the direction of the arrows 22. The scanning spot therefore jumps back almost to a level aligned with the right hand position of the top line 14 to begin the second raster. The distance travelled in reverse during the first raster by the top line 14 is indicated by an arrow 26, and the distance jumped by the scanning spot from the end of the first raster to the beginning to the second raster is indicated by an arrow 27. Shortly after the end of the second raster the bottom line 28 of the next frame after the frame 12 in the reverse direction reaches the position which the bottom line 18 occupied at the beginning of the first raster and its top line reaches the former position of the top line 14.

It will be seen that the vertical extent of each raster depends on the speed of movement of the film and on the direction of this movement. It will also be seen that the jump in the position of the scanning spot from the end of one raster to the beginning of another when scanning the same film frame picture has the vertical extent of approximately the distance between the bottom and top edges of the picture the jump being more by the distance travelled forwards by the film in the time that the scanning spot is blanked between rasters, or being less by the distance travelled in reverse by the film in that time, depending on the direction of movement of the film. Furthermore, it will be seen that the jump required from the end of the last raster scanning one frame to the beginning of the first raster scanning the next frame has the vertical extent of approximately the distance from the bottom line of the picture of the leading frame to the top line of the picture of the following frame, being for forward film movement less than the width of one horizontal border separating two film pictures by the distance travelled by the film in the time during which the scanning spot is blanked, and for reverse film movement is less than the length of two frames less one horizontal border width by the distance travelled by the film in the time during which the scanning spot is blanked.

If the film rate is twenty-four frame per second and the raster generation rate is sixty fields per second, as for NTSC in the United States of America, successive pictures of the film 11 must be scanned alternately twice and three times. In each picture scanned twice, the relative positioning is similar to that described hereinbefore with reference to FIGS. 1 and 2. For each picture scanned three times, there are two jumps between rasters, each jump corresponding substantially to the jumps represented by the arrows 20 and 27, but the second jump being displaced in the direction of film movement by a distance proportional to the rate of the film movement, and a final jump which for forward film movement is again approximately the width of the horizontal border between the adjacent film pictures, and for reverse film movement is again approximately the length of two frames less one horizontal border width. It will also be seen that the beginning of the third raster when a film picture is being scanned three times occurs before the top line of the picture has moved the length of one frame. Consequently, the starting points for every raster can be known if the position of the top line of the picture in each frame is known throughout the time taken for that top line to move the length of one frame past a reference point. This consequence is true for all speeds of film movement forwards or in reverse. However, if the speed in film frames per second exceeds the rate of raster generation in rasters per second, not all of the film pictures can be scanned since to scan every film picture with the film moving faster than the rate of raster generation would require the positions of successive rasters to be continually displaced further in the direction of the film movement. Furthermore, if the time over which rasters are started on each film frame is allowed to be longer than the time taken for the top edge of the picture of the film frame to move through the length of one frame, successive pictures would again require the positions of successive rasters to be continually displaced further in the direction of the film movement.

Figure 3:
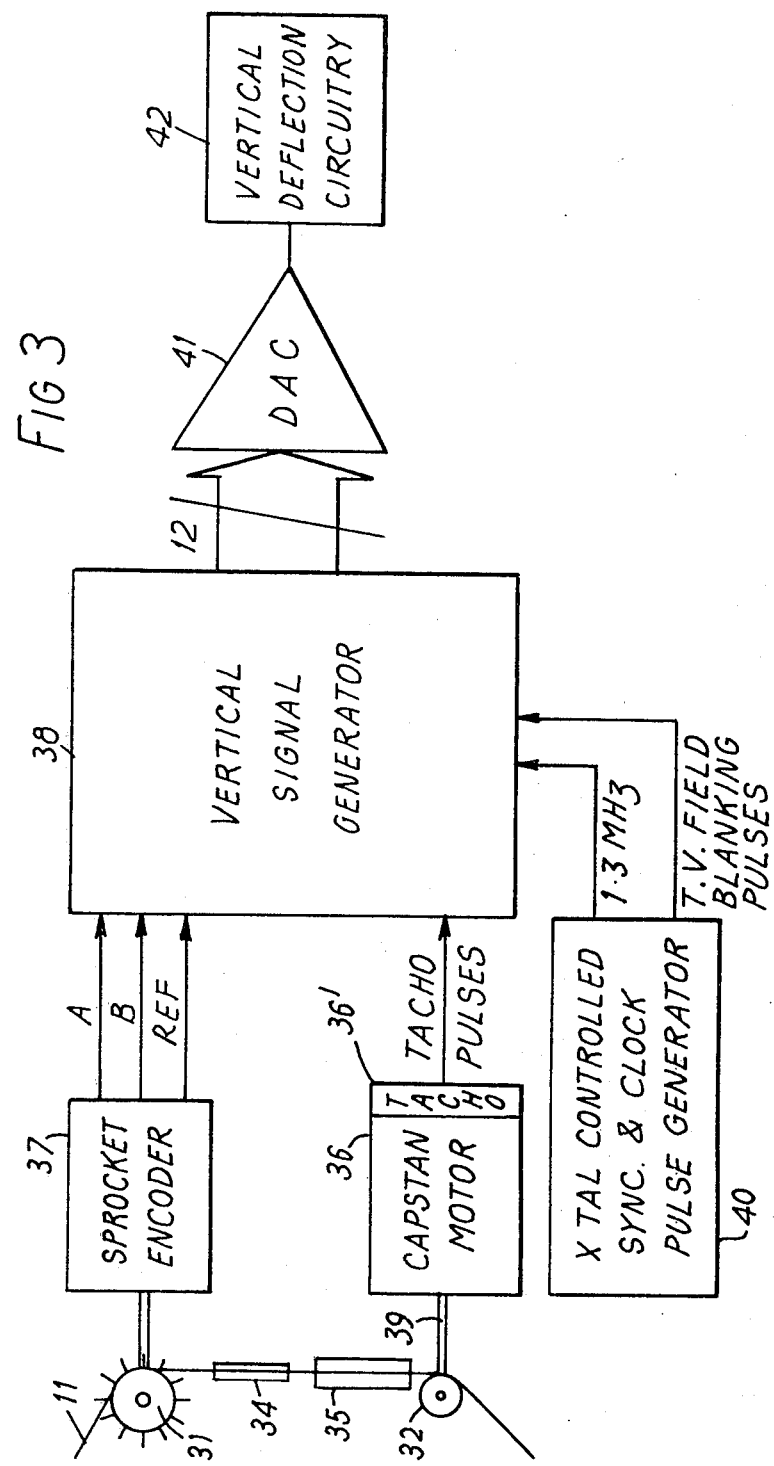
FIG. 3 is a block diagram of apparatus embodying the invention.

FIG. 3 shows in block form an apparatus embodying the present invention and engaging a portion of a film 11 by means of a twelve tooth sprocket 31 and a capstan 32. Between the sprocket 31 and the capstan 32 the film 11 passes through a film gate 34 and a sound head unit 35. In forward film motion, the film 11 passes from the sprocket 31 to the capstan 32. The apparatus of FIG. 3 forms part of a continuous motion flying spot film scanner in which a cathode ray tube (not shown) is used to produce a raster an image of which is projected by a suitable optical system (not shown) onto a film frame in the gate 34. The film 11 is, in forward motion, unwound from a supply spool (not shown) and wound onto a take-up spool (not shown). The capstan 32 is driven at a steady speed, for normal forward motion of the film 11 by a capstan motor 36. Film transport systems for continuous motion flying spot scanners are well known and need not be further described herein.

The sprocket 31 is equipped with a sprocket encoder 37 which, in operation, produces three output signals, two rectangular waveforms A and B which are in quadrature, and a stream of widely spaced reference pulses REF. These three output signals are supplied to a vertical signal generator 38 which also receives a train of pulses TACHO PULSES from a tachometer 36' driven by the output shaft 39 of the capstan motor 36. In one example the tachometer 36' generates pulses at the rate of 10.4 kilohertz when the film is moving at 25 frames per second. The vertical signal generator 38 receives also a stream of clock pulses at substantially 1.3 megahertz and television field blanking pulses, both from a crystal controlled synchronising and clock pulse generator 40.

The vertical signal generator 38 uses the six inputs A, B, REF, TACHO PULSES, 1.3 MHz and TV FIELD BLANKING PULSES to produce a twelve bit digital output signal the value of which at any time determines the vertical position of the scanning spot of the cathode ray tube (not shown) mentioned hereinbefore, the twelve bit digital output signal being converted to an analog signal by a digital to analog converter 41 and the resultant analog signal being supplied to vertical deflection circuitry 42 of the cathode ray tube (not shown).

Figure 4:
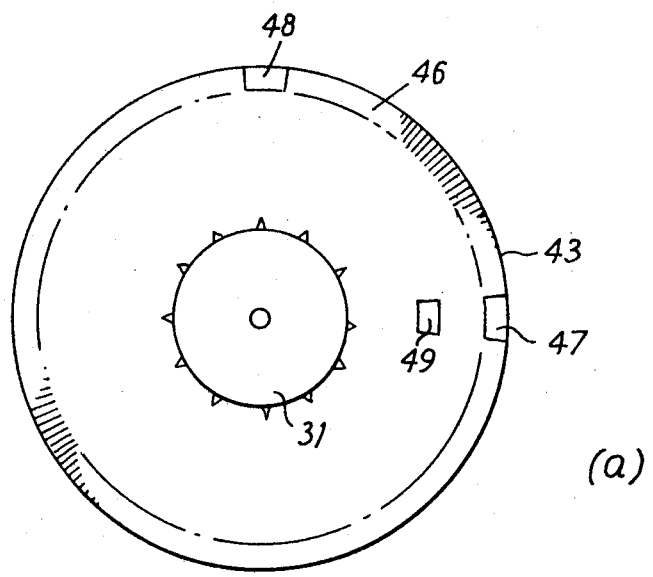
FIG. 4 is a pair of schematic views of a signal generating device included in the embodiment of FIG. 3.
Figure 4:
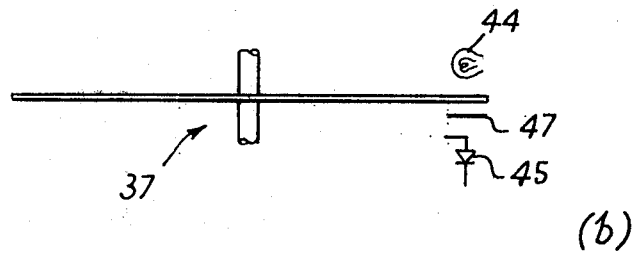

The sprocket 31 and its encoder 37 are shown, somewhat schematically, in FIG. 4 where at (a) an encoder disc 43 is shown mounted coaxially with the sprocket 31, so as to separate light sources such as a source 44 from light sensors such as a photodetecting diode 45.

The disc 43 has a radially graduated transparent peripheral edge region 46. Two small optical gratings 47 and 48 are arranged at fixed positions facing respective portions of the edge region 46. Each of the gratings 47 and 48 has a line spacing equal to that of the graduation on the edge portion 46 of the disc 43. The relative arrangement of the gratings 47 and 48 is such that the variations in light transmitted through the edge region 46 and the grating 48 as the disc 43 rotates in the direction for forward movement of the film 11 leads by 90° in phase the variation in light transmitted through the edge region 46 and the grating 47 from the source 44 to the diode 45. Correspondingly, the variation transmitted through the grating 48 lags 90° behind the variation transmitted by the grating 47 for reverse movement of the film 11. The source and photodetecting diode for the grating 48 are not shown. A further source and photodetecting diode (not shown) are provided at opposite sides of the disc 43 to provide a pulse each time a transparent window 49 in the disc 43 passes them. Thus the signals A, B and REF are produced as the disc 43 rotates by the respective light sensors cooperating with the gratings 47 and 48 and the window 49.

The edge region 46 of the disc 43 is divided into 1080 transparent segments by its graduation, and 1/12 of a rotation of the twelve tooth sprocket 31 corresponds to the movement of the film 11 by which one film frame is replaced by another at any given position. Hence each such movement of the film 11 in the forward direction results in the generation of 90 pulses in the B signal and a 90° delayed train of 90 pulses in the A signal. Furthermore, one pulse of the REF signals is produced for every 12 frames movement of the film 11.

It is arranged that the leading edge of each REF pulse occurs at the time when the top line of a film frame picture is at a reference position in the gate 34.

Figure 5:
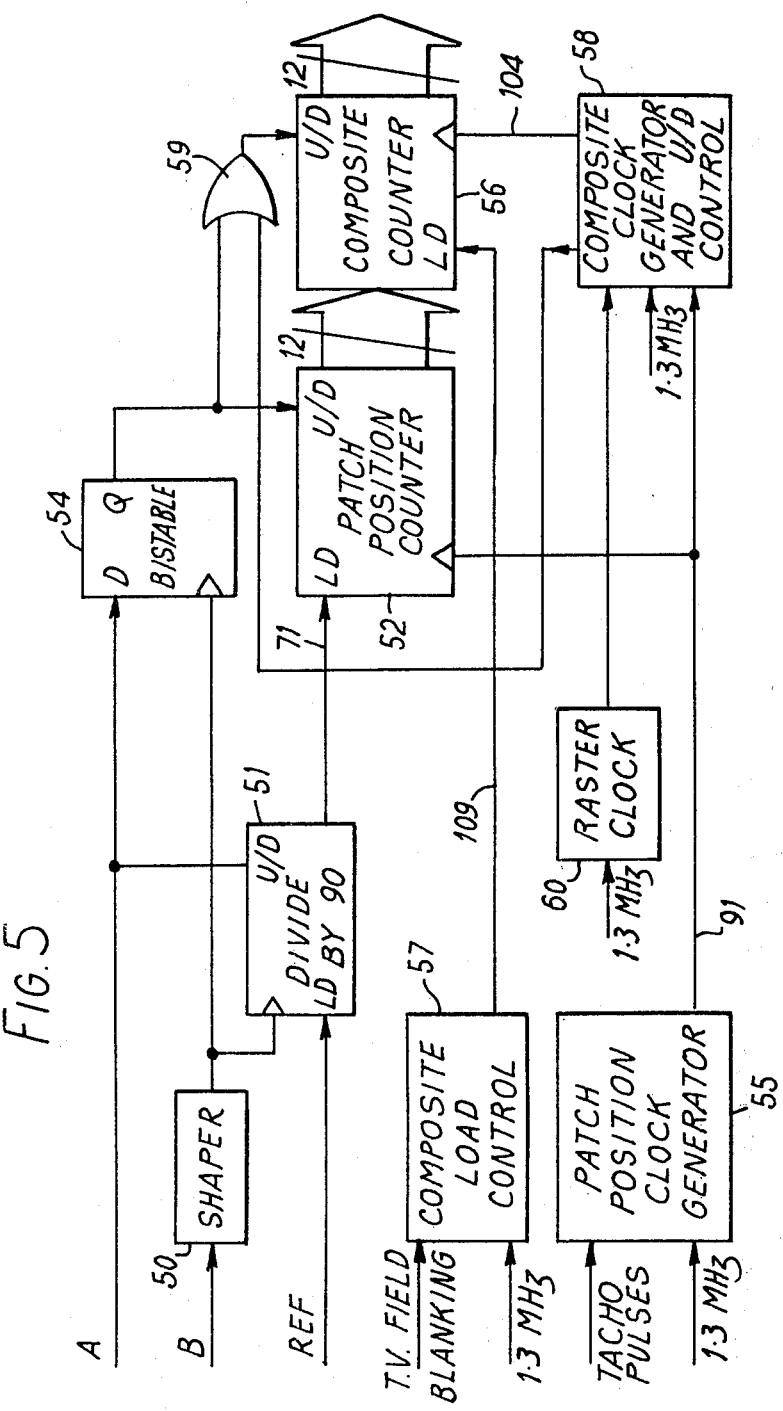
FIG. 5 is a block diagram of the vertical signal generator of FIG. 3.

By referring to FIG. 5 which shows the vertical signal generator 38 in more detail, it will be seen that the B signal is supplied to a shaper 50 and that the shaped B signal is supplied as a clock input signal to a divide by 90 circuit 51. The REF signal is supplied to the circuit 51 as a resetting or load signal, and the A signal is supplied thereto as an up/down control signal, the circuit 51 being a first up/down counter adapted to count up from 0 to 89 and then reset to 0 or to count down from 89 to 0 and then reset to 89, such counting cycles being carried out repeatedly in response to a continuing stream of pulses constituting the shaped B signal, the cycle 0 to 89 being carried out while the shaped B signal pulses lead the A signal pulses, and the 89 to 0 cycle being carried out while the shaped B signal pulses lag the A signal pulses. The A signal pulses are supplied to an up/down terminal U/D of the circuit 51.

The application of the REF signal to the load control input LD of the circuit 51 ensures that resettings of the circuit 51 occur at the times when successive top lines of film frame pictures arrive at the reference position in the gate 34.

The resetting signals of the circuit 51 are supplied to the reset or load control input LD of a second up/down counter 52 referred to herein as the patch position counter. The A signal pulses are supplied to a D input of a bistable circuit 54 which receives the shaped B signal pulses as clock pulses. The bistable circuit 54 is such that the value of the signal at its D input at the time of occurrence of a positive edge of a clock pulse supplied to the circuit 54 is established at a Q output of the circuit 54. Consequently when the A signal pulses lead the shaped B signal pulses the patch position counter 52 counts up and when the A signal pulses lag the shaped B signal pulses the patch position counter 52 counts down. The counter 52 is arranged to count up from 010000000000 (binary notation) and to count down from 100101010101 (binary notation).

Clock pulses are supplied to the patch position counter by a patch position clock generator 55. The output pulses generated by the patch position clock generator 55 are selected from a 1.3 megahertz input to the generator 55, the selection being controlled by and substantially a function of the TACHO PULSES generated by the tachometer 36' of the capstan motor 36 so that the count in the patch position counter 52 tracks each length of film that moves past the capstan 32 during the interval between two successive resettings of the counter 52. If the length of film between successive sprocket holes is the same throughout the portion of film between the sprocket 31 and the capstan 32, the count in the counter 52 then effectively tracks the position of each top line of each film frame picture as this line moves from the reference position in the gate 34 to the position it reaches by the time that the top line of the next film frame picture arrives at this reference position.

The count in the patch position counter 52 appears as a 12 bit output signal and is supplied as a loadable input to a third up/down counter referred to herein as the composite counter 56. Loading of this input signal into the composite counter 56 is effected at the occurrence of a short pulse developed at the trailing edge of each television field blanking pulse by a composite load control 57 which receives as input signals the television field blanking pulses and the 1.3 megahertz clock pulses.

Each time that the composite counter 56 receives an output pulse from the composite load control 57, the count in the composite counter 56 is set to whatever value is presented to it by the patch position counter 52 at that time. This ensures that the count in the composite counter 56 is always loaded at the beginning of each television field to a number representing the current position of the top line of the film frame picture to be scanned.

The composite counter 56 receives clock pulses generated by a composite clock generator and up/down control 58 which also supplies an up/down control signal to the up/down control input U/D of the composite counter 56 through a two input OR gate 59 connected as shown to the Q output of the bistable circuit 54. The composite counter 56 consequently counts up whenever Q of the bistable circuit 54 is high, ie whenever the A signal pulses lead the shaped B signal pulses, which occurs for the reverse direction of movement of the film, and whenever the composite clock generator and up/down control 58 produces a high up/down control signal.

The generator and control 58 receives as input signals the clock pulses produced by the patch position clock generator 55, the 1.3 megahertz clock pulses and raster clock pulses generated by a raster clock 60 supplied with the 1.3 megahertz clock pulses. The raster clock is a divider circuit which, for a 50 hertz scanning raster, provides raster clock pulses at a rate of 68.266 kilohertz.

The up/down control signal produced by the generator and control 58 is a square wave at half the raster clock frequency. The clock pulses produced by the generator and control 58 are related to the raster clock pulses during the times that the up/down control signal produced by the generator and control 58 is high and related to the patch position clock pulses during the times that the up/down control signal produced by the generator and control 58 is low. Consequently, during forward film movement, the composite counter 56 receives as an up/down control signal a low signal from the Q output of the bistable 54 and a square wave from the generator and control 58, with the result that the composite counter 56 counts up while supplied with clock pulses related to the raster clock pulses and counts down while supplied with clock pulses related to the patch positions clock pulses. It is arranged that when the film 11 is moving at 25 frames per second this alternate counting up and counting down gives a net upward count corresponding to slightly more than the required vertical deflection represented in FIG. 1 by the arrow 15, or to the vertical deflection required in the raster following that represented by the arrow 15. The jump represented in FIG. 1 by the arrow 20 is represented in the composite counter 56 by the change in count which occurs when an output signal of the patch position counter 52 is loaded into the composite counter 56.

During reverse movement of the film at 25 frames per second, the composite counter 56 receives as an up/down control signal a continuous high signal from the Q output of the bistable circuit 54, the low levels in the square wave supplied by the generator and control 58 to the OR gate 59 being swamped by this continuous high level. Consequently the composite counter 56 continually counts up during reverse film movement, and is reset at every television field blanking pulse to the count in the patch position counter 52. It is arranged that each count in the counter 56 between successive loadings in this mode of counting corresponds to slightly more than the length of the arrow 25 in FIG. 2 and that the first and last numbers of each such count correspond to the vertical positions, relative to the gate 34, of the line 23 and a level slightly higher than the line 24 of FIG. 2 or of the starting level and slightly higher than the finishing level of the raster following that represented by the arrow 25.

Thus the count in the composite counter 56 is representative of the required vertical position of the scanning point during any raster. The count in fact includes numbers slightly beyond those representing positions in the required raster but since there is blanking of the beam of the cathode ray tube (not shown) during the counting through of these numbers there is no need to prevent their resulting in an analog output at the vertical deflection circuitry 42.

Figure 6:
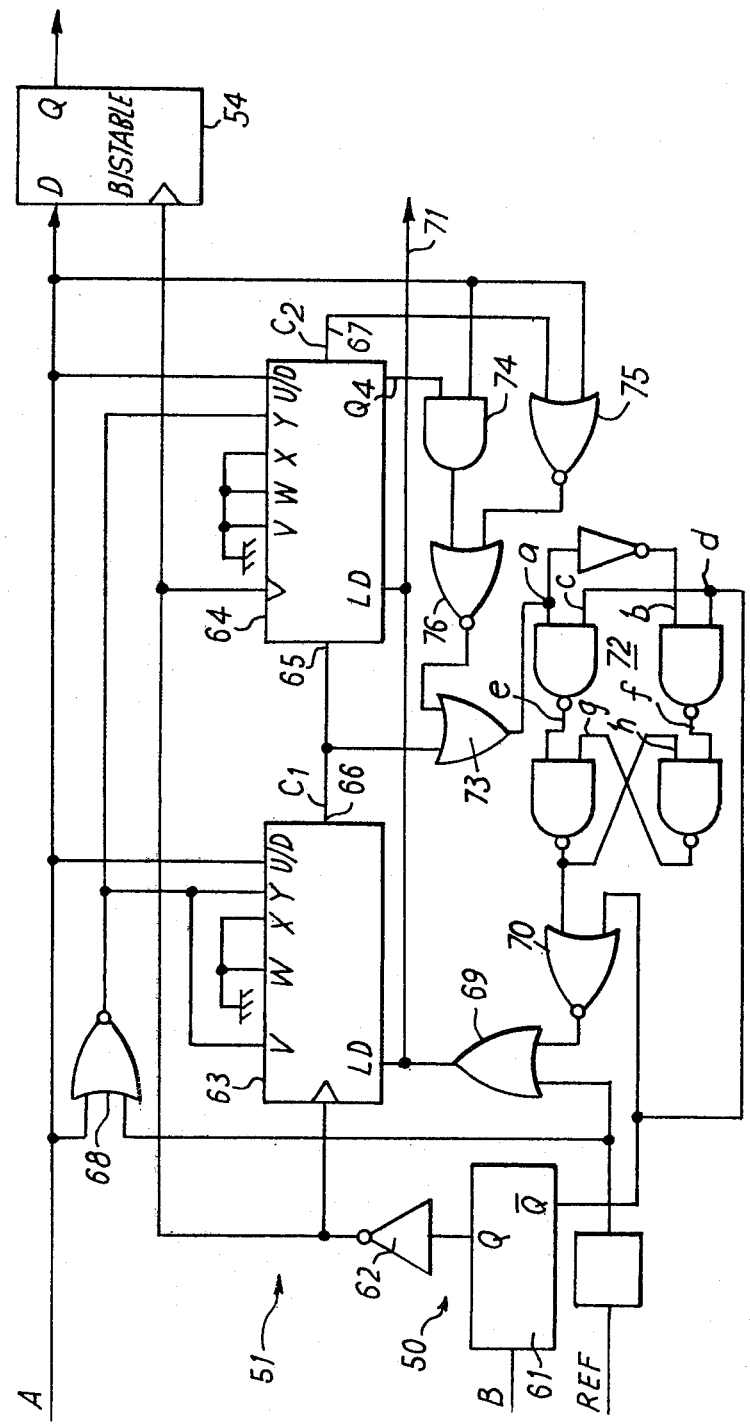
FIGS. 6 to 9 are diagrams of integrated circuit unit and logic circuitry elements of parts of the embodiment of FIG. 3.

FIG. 6 shows in more detail the shaper 50 and the divide by 90 circuit 51.

The shaper 50 consists of a monostable circuit 61 provided with Q and $\overline{Q}$ outputs, and an inverter 62 connected to the Q output of the monostable circuit 50. The divide by 90 circuit 51 includes two up/down decade counters 63 and 64. The decade counters 63 and 64 have their clock inputs connected to the output of the inverter 62 to receive the shaped B signal pulses which in one example have a length of 1 microsecond. The counter 63 counts all pulses supplied to its clock input but the counter 64 has a clock enable input 65 connected to the carry output 66 of the counter 63 where a carry signal $\overline{C}_1$ appears only when the count in the counter 63 is at 9 or 0. Consequently the counter 64 operates a tens decade, counting only those shaped B signal pulses which change the count in the counter 63 from 9 to 0, or from 0 to 9 when counting down. The counter 64 also has a carry output 67 at which a carry signal $\overline{C}_2$ appears only when the count in the counter 64 is at 9 or 0. However, as will be explained hereinafter, the count 9 is never allowed to appear in the counter 64 and consequently the appearance of $\overline{C}_2$ always indicates zero count in the counter 64.

The A signal pulses are supplied as shown to up/down control inputs of the decade counters 63 or 64 and it is arranged that the counter 63 and 64 count up when the shaped B signal pulses arrive during a high A signal A and down when these clock pulses arrive during a low A signal $\overline{A}$. The counts with which the counter 63 and 64 are reset determined by signals applied to four inputs V, W, X and Y of each counter during the application of a load control signal applied to each load control input LD of each counter 63 or 64. Inputs W and X of the counter 63 and V, W and X of the counter 64 are permanently grounded to logic 0. The inputs Y of the counters 63 and 64 are coupled as shown by a NOR gate 68 to be controlled by the A signal and the delayed REF signal produced by coupling the REF signal through a 1 microsecond delay monostable 49'. The V input of the counter 63 is also controlled by the NOR gate 68. Consequently when counting up, the counters 63 and 64 reset to 0000, and when counting down, the counter 64 resets to 1000=8, and the counter 63 resets to 1001=9, unless the REF signal is high when they reset to 0000. Since the duration of a high level of the delayed REF signal, i.e. the duration of a pulse generated by the monostable 49' is shorter than one cycle of the A signal, on the occurrence of the next shaped B signal pulse after the delayed REF signal has reset the counters 63 and 64 to 0000, these counters are reset to 89 as required.

The load control input terminals LD of the counters 63 and 64 are connected to the output of a two input OR gate 69 which receives the delayed REF signal and the logic level at the output of a NOR gate 70 as input signals. Thus the REF signal ensures that the counting cycles of the counters 63 and 64 are related to the angular position of the encoder disc 43 and hence to the position of the top line of the picture of a film frame to be scanned by resetting the counters 63 and 64 to zero at a predetermined position of every twelfth film frame moving through the film gate 34. The output of the OR gate 69 is also connected at 71 to the load control input of the patch position counter 52 so that this counter 52 is reset at the correct times in relation to the movement of the film.

The NOR gate 70 has two inputs one of which receives the $\overline{Q}$ output signal of the monostable circuit 61 and the other the output signal of a latch circuit 72 formed by four NAND gates and an inverter connected as shown in a manner which will be readily understood by those skilled in the art. The latch circuit 72 receives two input signals, the $\overline{Q}$ output signal of the monostable circuit 61 and the output signal of a two input OR gate 73. Application of the $\overline{Q}$ output signal of the monostable circuit 61 to the NOR gate 70 ensures that the output of the NOR gate 70 responds to the output of the latch circuit 72 only when the Q output of the monostable circuit 61 is high, the logic being 1 for a high level signal and 0 for a low level signal. The inputs of the four NAND gates of the latch circuit 72 are referenced a, b, c, d, e, f, g and h as shown in FIG. 6 and it will be seen that the inputs c and d receive the $\overline{Q}$ output signal of the monostable circuit 61. As will be explained hereinafter, it is arranged that the output logic signal of the OR gate 73 is 0 only at those times at which the counters 63 and 64 are to be reset. When a=0 and c=d=1, h=0. When a=1 and c=d=1, h=1. Since the $\overline{Q}$ output of the monostable circuit 61 controls the NOR gate 70, the output of the NOR gate 70 goes to 1 only at times when h=0 and c=d=0. When c=d=0, the NAND gates with inputs a and b are inhibited and hence the output h of the latch cannot change while the NOR gate 70 is open. Consequent the NOR gate 70 can supply logic 1 to the OR gate 69 only when there is both a logic 1 at the $\overline{Q}$ output of the monostable circuit 61 and a=0. For a=0, the condition is, for counting up, A=1, $C_1$=0, $C_2$=1 and $Q_4$=1 where $Q_4$ is the binary output for a count of 8 in the counter 64, and, for counting down, A=0, $C_1$=0, $C_2$= and $Q_4$=0. The OR gate 73 and a combination of an AND gate 74 and two NOR gates 75 and 76 connected as shown detect these conditions and provide logic 0 at a for these conditions and logic 1 at a for any other conditions. Thus resetting pulses appear at the output of the OR gate 69 whenever the counters 63 and 64 reach 89 when counting up or 0 when counting down.

Figure 7:
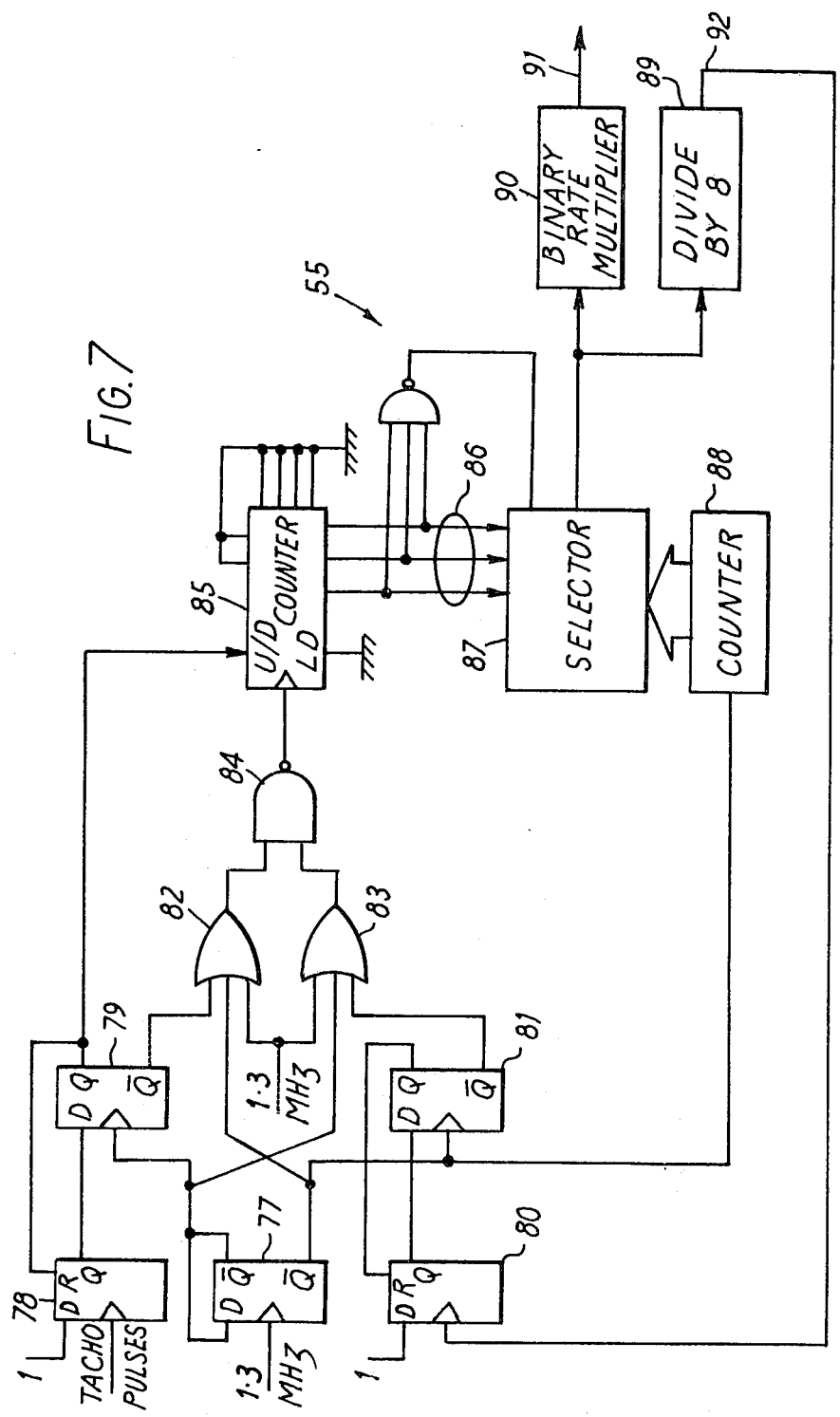

FIG. 7 shows the patch position clock generator 55 in more detail. The generator 55 includes five bistable circuits 77, 78, 79, 80, and 81. Each of these bistable circuits has a clock input, the circuit 77 receiving the 1.3 megahertz pulses as clock pulses, and the circuit 78 receiving the TACHO PULSES as clock pulses. The circuits 77, 79 and 81 have respective D inputs and Q and $\overline{Q}$ outputs and are such that at each clock pulse, the logic signal at D appears at Q and its inverse at $\overline{Q}$. The circuits 78 and 80 have respective R inputs and Q outputs and are such that Q goes to 1 at each clock pulse and is reset to 0 at a change from 0 to 1 at its R input. The Q outputs of the circuits 79 and 81 control the R inputs of the circuits 78 and 80 respectively as shown. The circuit 77 divides the 1.3 megahertz clock signal by 2 and supplies the resulting 0.65 megahertz square waves at its Q and $\overline{Q}$ outputs to the clock inputs of the circuits 81 and 79 respectively. This ensures that the clocking of the circuits 81 and 79 is 180° out of phase. The $\overline{Q}$ outputs of the circuits 79 and 81 are connected respectively to inputs of two OR gates 82 and 83 each having the 1.3 megahertz pulses supplied as a second input signal. The gate 82 receives the $\overline{Q}$ output of the circuit 77 as a third input, and the gate 81 receives the Q output of the circuit 77 as its third input. The outputs of the OR gates 82 and 83 are connected to the inputs of a two input NAND gate 84 so that the output of the NAND gate 84 is at one only when at least one of the OR gates 82 and 83 has 0 as its output. This can only occur while the 1.3 megahertz signal is at the low level, and hence the output of the NAND gate 84 goes to 1 in pulses of about 0.3 microsecond duration. The circuit 77 ensures that the outputs of the gates 82 and 83 cannot both be at 0 at the same time. The pulses produced by the NAND gate 84 are supplied as clock pulses to the clock input of an up/down counter 85 the direction of counting of which is controlled by the signal at the Q output of the circuit 79. Consequently the counter 85 counts up when receiving clock pulses enabled by the $\overline{Q}$ output of the circuit 79 and counts down when receiving clock pulses enabled by the $\overline{Q}$ output of the circuit 81. The counter 85 has an 3-bit parallel output 86 which is coupled as a controlling input to a selector 87 which, in dependence upon the count in the counter 85, selects one of eight outputs of an 8-bit counter 88 coupled thereto and enables pulses appearing on the selected output of the counter 88 to pass to a divide by 8 circuit 89 and a binary rate multiplier 90. The output 91 of the binary rate multiplier 90 is the output of the patch position clock generator and is connected as shown in FIG. 5. The output 92 of the divide by 8 circuit 89 is connected to the clock input of the bistable circuit 80 thereby completing a feedback coupling of the selector 87 to the counter 85.

The counter 88 has its clock input connected to the $\overline{Q}$ output of the bistable circuit 77, so that the counter 88 receives a clock pulse only during alternate cycles of the 1.3 megahertz clock signal, so that the clock input of the counter 88 is supplied a train of approximately 0.8 microsecond pulses with a repetition rate of 0.65 magahertz. The selector 87 gates the eight binary output signals of the counter 88 so as to synthesise a pulse rate substantially proportional to the prevailing rate of the TACHO PULSES, the counter 85 acting as a comparator of the synthesised rate fed back through the divide by 8 circuit 89 and the controlling input signal in the form of the TACHO PULSES.

The binary rate multiplier 90 multiplies the rate produced by the selector 87 by a non-integral factor to provide the required pulse rate at the output 91.

Figure 8:
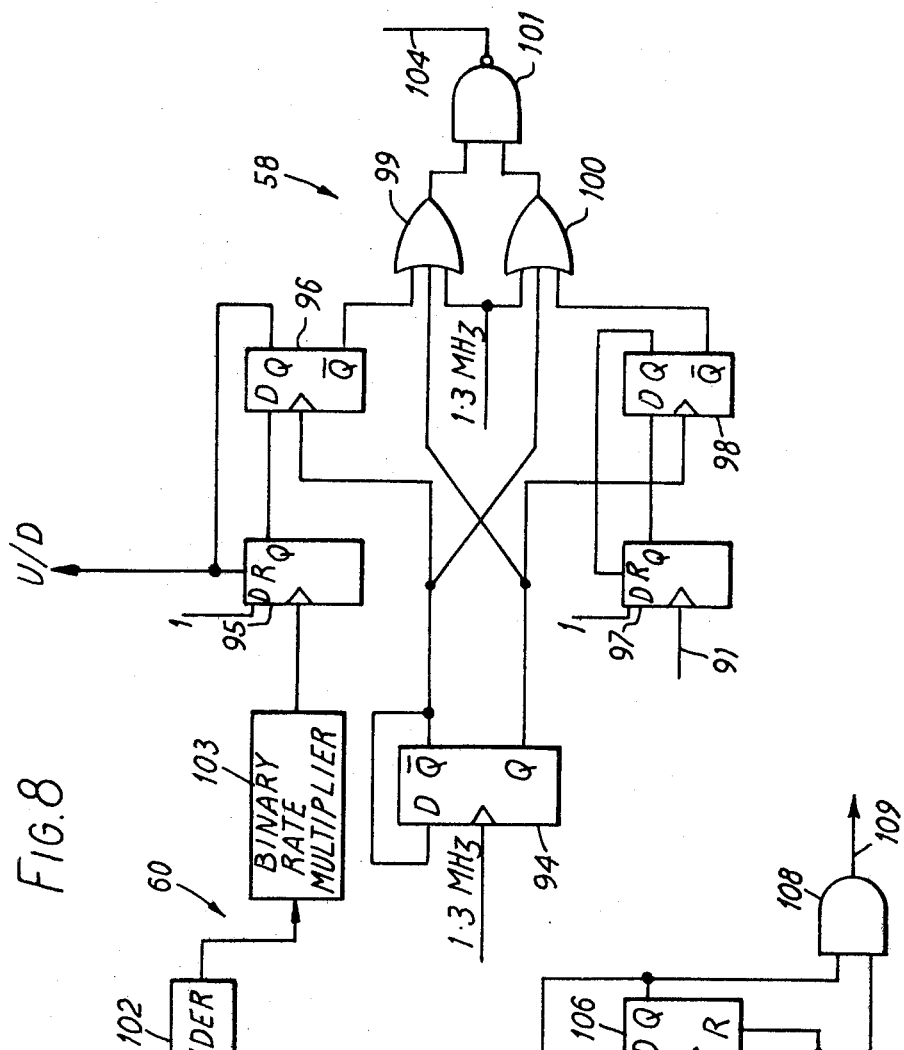

FIG. 8 shows the composite clock generator and up/down control 58 in more detail. This generator and control 58 is similar to part of the generator 55, there being five bistable circuits 94 to 98 corresponding to the circuits 77 to 81 of FIG. 7, and two OR gates 99 and 100 and a NAND gate 101 corresponding to the gates 82, 83 and 84 of FIG. 7. The raster clock 60 is also shown in FIG. 8 and consists of a divider 102 receiving the 1.3 megahertz signal as input signal and supplying, for example, a 162.5 kilohertz output signal to a binary rate multiplier 103 which produces, for example, a 68.266 kilohertz output signal which is the clock input to the bistable circuit 95 of the generator and control 58.

The Q output of the bistable circuit 96 provides the up/down control signal supplied by the generator and control 58 to the OR gate 59, and the bistable circuit 97 receives the patch position clock generator output pulses as clock pulses. The bistable circuit 94 may in fact be the bistable circuit 77 of FIG. 7. The output 104 of the NAND gate 101 is the clock output of the generator and control 58 and is connected to the clock input of the composite counter 56 as shown in FIG. 5. The circuits 94 to 98 and gates 99 to 101 operate in the same way as the corresponding circuits of FIG. 7 so that 1.3 megahertz pulses are enabled by the circuit 96 while the Q output of the circuit 96 is high, and by the circuit 98 while the Q output of the circuit 96 is low. Consequently the composite counter 56 counts up for clock pulses enabled by the raster clock 60, and down for the clock pulses enabled by the patch position clock generator 55, unless the Q output of the bistable circuit 54 is high in which case the composite counter 56 counts all clock pulses up, as explained hereinbefore.

Figure 9:
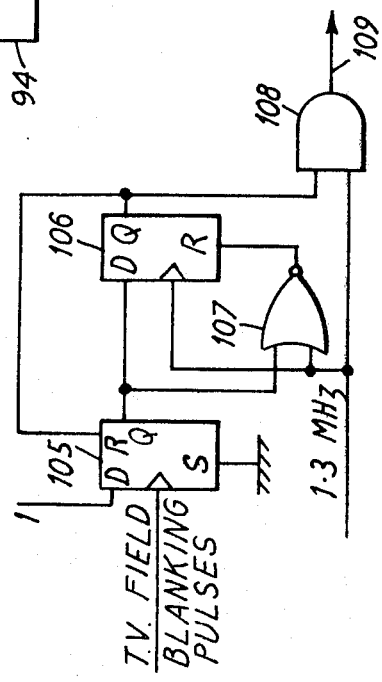

FIG. 9 shows the composite load control 57 in more detail. In this control 57, the television field blanking pulses from the generator 40 of FIG. 3 are supplied to the clock input of a bistable circuit 105 having a Q output connected respectively as shown to a bistable circuit 106 and a NOR gate 107. The 1.3 megahertz signal is supplied to an input of the NOR gate 107 and to the clock input of the bistable circuit 106 which has an R input connected to the output of the gate 107 so that at a Q output of the bistable circuit 106 there appears one approximately 1.5 microsecond pulse at the beginning of each television field blanking pulse. These Q output pulses are gated with the 1.3 megahertz signal in an AND 108 connected as shown. The output 109 of the AND gate 108 is connected to the load control input LD of the composite counter 56 as shown in FIG. 5. Thus the load control signal to the composite counter 56 is a series of 0.3 microsecond pulses each occurring at the beginning of a respective television field blanking pulse.

The embodiment of the present invention described hereinbefore with reference to FIGS. 3 to 9 processes signals representative of the direction of film movement, rate of film movement, position of each film frame in a film gate, times for television fields to begin, and rate of vertical deflection in a raster suitable for scanning a stationary film frame, to produce a composite output signal suitable for effecting the vertical deflection and positioning of a raster intended to scan a frame of a film moving so as to give rise to such signals, the processing not including production of the two conventional signals. The required processing is effected by the patch position counter 52 in which the number represents the current position of the reference point in whichever film frame is entering the scanning region defined by the film gate 34, and the composite counter 56 in which the counting is started at the beginning of each television field from the loading in of the current number in the position counter 52, and is effected from this number by clock pulses supplied by the output 104 of the generator and control 58 in a manner dependent on the rate of vertical deflection in a raster suitable for scanning a stationary film frame, and the rate and direction of movement of the film. The direction of counting for the clock pulses representing the stationary frame raster rate is predetermined in accordance with the orientation of the film frame pictures relative to the apparatus. The direction of counting for the clock pulses representing the film rate is determined in dependence upon the direction of movement of the film, and is opposite to that for the clock pulses representing the stationary frame raster rate when the film is moving forward, and the same when the film is moving in reverse. The number in the composite counter 56 is converted into an analog signal which is supplied to vertical deflection circuitry determining the vertical deflection of the beam of the cathode ray tube (not shown) producing the scanning raster.

Provided that the frame rate of the film does not exceed the television field rate, this apparatus will scan each frame picture at least once and so can be used in a flying spot continuous motion film scanner in which the speed of the film is variable from zero to fifty frames per second. Some frames will be scanned even if the film moves at more than fifty frames per second.

For a scanner for use in the NTSC system, the field frequency is 60 Hz and the raster clock 60 must produce a suitable repetition rate. Film can be run at 24 frames per second and the apparatus embodying the present invention as described hereinbefore will automatically produce the vertical deflection signals for scanning alternate frames twice and three times.

Suitable integrated circuits (ICS) for use as the counters 63 and 64, the monostable circuit 61, and the counter 85 are respectively two CD4029AD ICs, half of 740221, and a 4029. The patch position counter 52 may be made from three CD4029AD ICs, programmed to reset to 010000000000 for counting up, and to 100100010101 for counting down. The composite counter 56 may also be made from three CD4029AD ICs. The selector 87 may be a single 4029. The counter 88 and the divide by 8 circuit 89 may each be two 4029 ICs. The pairs of bistable circuits 54 and 77, 78 and 79, 90 and 91, 95 and 96, and 97 and 98 may each be a 4013 IC, the bistable 77 serving as the bistable 94. The batch circuit 72 can be formed from a single 4011 IC providing the four NAND gates and a 4009 IC providing the inverter, another inverter of the 4009 serving as the inverter 62. The various OR, AND, NOR and NAND gates of FIGS. 6 to 9 may be provided by ICs such as 4071, 4001, 4081 and 4011. The divider 102 of FIG. 8 may be a 4024A IC.

Comparing the circuitry of FIGS. 7 and 8 at a more general level, it will be seen that each of these two FIGS. shows an example of an arrangement for producing from two input trains of pulses a further train of pulses which has an average repetition rate related to the sum of the repetition rates of the two input trains of pulses. In FIG. 7, the two input trains of pulses are the tacho pulses and the output pulses from the divide by 8 circuit 89 respectively, and in FIG. 8, the two input trains of pulses are the output pulses of the binary rate multiplier 103 and the pulses supplied to the clock input of the bistable circuit 97. The further train of pulses appears in FIG. 7 at the output terminal of the NAND gate 84, and the further train of pulses appears in FIG. 8 at the output terminal of the NAND gate 101.

Furthermore, comparing FIG. 7 with the combination of FIGS. 5 and 8, it will be seen that the composite counter 56 of FIG. 5 corresponds in the way in which its direction of counting is controlled to the counter 85 in FIG. 7. However, the circuitry of FIG. 7 employs the counter 85 in a digital servo-loop in which the counter 85 acts as comparator and one of the input trains of pulses, namely that supplied by the divide by 8 circuit 89, serves as the feedback signal. The train of tacho pulses supplied to the bistable circuit 78 serves as the control signal in this digital servo-loop and the output of the counter 88 is the controlled signal, the selector 87 serving as the controller.

The further trains of pulses produced by the NAND gates 84 and 101 of FIGS. 7 and 8 respectively are the result of a time division multiplexing operation effected by the 5 bistable circuits 77 to 81 of FIG. 7 or 94 to 98 of FIG. 8.

Figure 10:
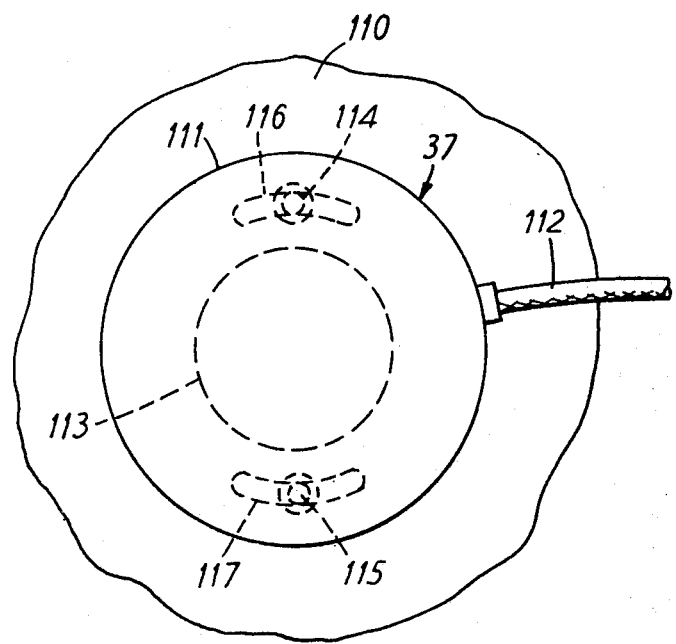
FIG. 10 is a side view illustrating adjustable mounting of a signal generating unit.

FIG. 10 shows the sprocket encoder 37 mounted on a panel 110 of a flying spot scanner incorporating the present embodiment of the invention. The encoder 37 has a body 111 within which the disc 43 of FIG. 4 is rotatably mounted by a shaft which extends out of the body 111 and has the sprocket 31 fixedly mounted thereon outside the body 111. A circular aperture 113 is provided in the panel 110 to allow installation of the sprocket 31 in its position in the film transport as indicated in FIG. 3. The body 111 of the encoder 37 has a diametrically opposite pair of threaded holes in which respective screws 114 and 115 are engaged, each screw extending through a respective arcuate slot 116 or 117 provided in the panel 110 and centred on the centre of the aperture 113. The optical gratings 47 and 48 shown in FIG. 4 are fixedly mounted to the interior of the body 111 of the encoder 37, together with the respective light sources and photodetecting diodes. The light source and photodetecting diode for the window 49 of the disc 43 are also fixedly mounted to the interior of the encoder body 111. Power lines for the three light sources and output lines for the signals A,B and REF are provided by a cable 112 coupled into the encoder 37.

Since the angular position of the window 49 is fixed relative to the angular positions of the twelve teeth of the sprocket 31, the position of the window 49 in its circular path relative to the panel 110 is representative of the positions of these teeth. By suitable positioning of the light source and photodetecting diode for sensing the window 49, the leading edge of the signal REF can be arranged to occur whenever one film frame in twelve has reached a chosen position, serving as a reference position, in the film scanning region of the film gate 34 of FIG. 3. To allow this detection of the reference position, the head of each of the screws 114 and 115, which is larger than the width of the respective arcuate slot 116 or 117 is arranged to be accessible from the side of the panel 110 remote from the encoder 37. Then, before the screws 114 and 115 are finally tightened to clamp the body 111 of the encoder 37 in a fixed orientation against the panel 110, the body 111 is turned about its axis, which coincides with the axis of rotation of the disc 43 until sensing of the reference position is achieved. The screws are then finally tightened. The arcuate slots 116 and 117 allow the body 111 to be turned through a maximum of slightly more than one twelfth of a revolution.

Sensing of the reference position is carried out by running a film through the film transport and displaying the picture signal generated by the film scanner on a television monitor screen. Unless the encoder body 111 is correctly orientated to sense the occurrence of the reference position, the picture displayed includes part of the gap between pictures in the film. The encoder body 111 is simply turned until the picture displayed is only the pictorial part of the film intended to be seen. When this is achieved, the encoder 37 is sensing the reference position and its body 111 can be fixed against the panel 110.

The light opening (not shown) of the film gate 34 of FIG. 3 is of sufficient extent parallel to the path of the film for slightly more than three complete film frames to be present in this opening. Hence when one film frame reaches the reference position, two other film frames are at respective further reference positions in the scanning region. Referring to FIGS. 1 and 2, it will be seen that the first line of the first screen of a film picture is at the position indicated by the broken horizontal line 16 in FIG. 1 for forward film movement and at the position indicated by the broken horizontal line 23 in FIG. 2 for reverse film movement. These positions 16 and 23 are not reference positions since they are determined by the occurrence of television field blanking pulses, but are slightly displaced from respective reference positions for the top line 14 of the picture of the frame being scanned. It will be seen that the reference positions for forward and reverse film motions are different and in fact they correspond to respective, simultaneously occurring positions of the respective top picture lines 14 of two different ones of the three film frames within the scanning region defined by the film gate 34. Hence the two different binary members from which the patch position counter 52 counts up and down respectively for the two different directions of film movement. Other units of a flying spot film scanner incorporating the present embodiment of the invention need not be described herein since such units are well known to the man skilled in the art and are also described in detail in the prior art such as the Focal Encyclopedia of Film & Television Techniques at pages 824 to 845, published in 1969 by the Focal Press of London and New York, and Principles of PAL colour Television and Related Systems by H. V. Sims, at pages 139 to 143, published by Iliffe Books Ltd. of London.

We claim:

1. Apparatus for use in scanning a cinematograph film from which a television video signal is to be produced while the film is being moved in a continuous manner in a film transport, the apparatus including
    signal generating means for generating a rate signal representing the rate of movement of a cinematograph film in the transport, a direction signal representing the direction of movement of the film, and a position signal representing the position of a predetermined point along the length of each film frame during the time in which the said point moves from a reference position in a film scanning region to a position reached when the predetermined point of the next film frame entering the scanning region arrives at the reference point,
    raster reference means for producing a raster reference signal having a value representative of the rate of increase of the vertical coordinate of a scanning raster of the dimensions required for scanning a frame of the film in the absence of movement of the film, and
    signal combining means connected to the signal generating means and to the raster reference means said signal combining means being responsive to said position signal and to said raster reference signal for sampling the value of the position signal substantially at each time at which a scanning raster is to be initiated, the combining means having a raster output and being further responsive to said direction signal and to said rate signal for producing at the raster output in each interval beginning substantially at the time of a respective sampled value of the position signal and ending substantially at the time of the next sampled value thereof an output signal having a value substantially representing the said vertical coordinate of the scanning raster required for scanning a frame of the film during the said interval, the said vertical coordinate being parallel to the length of the film at least at the scanning region.

2. Apparatus according to claim 1, wherein the signal generating means includes means for generating a reference train of pulses having a repetition rate which varies with but is not greater than the frame rate of the film.

3. Apparatus according to claim 2, wherein the means for generating a reference train of pulses is such that in operation the reference train has a repetition rate which is an integral submultiple of the frame rate of the film and is utilized in the production of a further reference train of pulses with a repetition rate equal to the frame rate.

4. Apparatus according to claim 3, wherein the signal generating means includes an up/down counter arranged to be so reset by each pulse of the further reference train that the count in this counter at the start of each counting cycle is representative of the said reference position, the said signal representative of rate of film movement being supplied as clock signal to the said up/down counter, and the signal indicative of direction of film movement being so supplied to the said up/down counter as to determine the direction of counting thereof in dependence upon the direction of movement of the film, whereby the count in the said up/down counter is representative of the position of the predetermined point of each film frame during the said time in which the said point moves from the reference position to the other said position.

5. Apparatus according to claim 1, wherein, for producing the said direction signal, the signal generating means includes means for generating two trains of pulses having equal repetition rates and a phase displacement relative to one another which changes only with change in the direction of movement of the film.

6. Apparatus according to claim 5, wherein the equal repetition rates of the said two trains are equal to an integral multiple of the frame rate of the film, and the signal generating means includes a pulse rate dividing counter adapted to divide the rate of one of the said two trains of pulses and to thereby produce the said further reference train of pulses, the dividing counter being arranged to be reset by each pulse of the first said reference train of pulses.

7. Apparatus according to claim 5 or 6, wherein the two trains of pulses having equal repetition rates are applied to a bistable circuit such that the state of the bistable circuit changes in response to a change in the relative phase displacement of the said two trains.

8. Apparatus according to claim 1, wherein, for use in so producing the said rate signal when the said rate signal varies with the length of film passing through the scanning region in a unit of time, the signal generating means includes a pulse generator arranged to generate pulses at a rate dependent upon the rate of rotation of a capstan drawing film through the said scanning region.

9. Apparatus according to claim 1, wherein the signal combining means includes an up/down counter adapted to load in the count in the up/down counter of the signal generating means substantially at each time at which a scanning raster is to be initiated and to count from the count thus loaded therein a plurality of clock pulses produced in the signal combining means in response to the said rate signal and a plurality of clock pulses produced in the signal combining means in response to the said raster reference signal, the direction of counting of the clock pulses produced in response to the said signal representations of rate of film movement being carried out in a direction determined by the direction signal and the direction of counting of the clock pulses produced in response to the said raster reference signal being arranged to correspond to the direction required for producing output signal values representative of the increasing vertical coordinate of a scanning raster for scanning a frame of the film in the absence of movement of the film.

* * * * *